(12) United States Patent
Kumar et al.

(10) Patent No.: US 11,356,557 B1
(45) Date of Patent: Jun. 7, 2022

(54) SYSTEM AND METHOD TO EVALUATE AGENT CALL LOGGING IN A CONTACT CENTER

(71) Applicant: NICE LTD, Ra'anana (IL)

(72) Inventors: Anshu Kumar, Pune (IN); Salil Dhawan, Maharashtra (IN); Somnath Kardak, Pune (IN)

(73) Assignee: NICE LTD, Ra'anana (IL)

( * ) Notice: Subject to any disclaimer, the term of this patent is extended or adjusted under 35 U.S.C. 154(b) by 42 days.

(21) Appl. No.: 17/121,791

(22) Filed: Dec. 15, 2020

(51) Int. Cl.
| | |
|---|---|
| G06F 40/30 | (2020.01) |
| H04M 3/51 | (2006.01) |
| G10L 15/30 | (2013.01) |
| G10L 15/22 | (2006.01) |
| G10L 15/18 | (2013.01) |

(52) U.S. Cl.
CPC .......... *H04M 3/5175* (2013.01); *G06F 40/30* (2020.01); *G10L 15/1815* (2013.01); *G10L 15/22* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 9,401,145 B1* | 7/2016 | Ziv ....................... G10L 15/197 |
| 9,881,614 B1* | 1/2018 | Thirukovalluru ....... G10L 15/26 |
| 11,228,681 B1* | 1/2022 | Rosenberg .............. G10L 15/26 |
| 2014/0153709 A1* | 6/2014 | Byrd ................. H04M 3/42221 |
| | | | 379/265.09 |
| 2021/0126999 A1* | 4/2021 | Sachdev ............... H04M 1/656 |

\* cited by examiner

*Primary Examiner* — Nafiz E Hoque
(74) *Attorney, Agent, or Firm* — Soroker Agmon Nordman

(57) ABSTRACT

A computerized method for evaluating agent-call-logging, in a contact center, is provided herein. The method includes operating an evaluating agent-call-logging module. The operating of an evaluating agent-call-logging module includes: (i) receiving a recorded interaction between an agent and a customer, stored in the database of recorded interactions and a corresponding agent-call-logging, having 'n' sentences, stored in the database of call loggings; (ii) operating a speech-to-text algorithm on the received recorded interaction to yield a summarized text thereof. The yielded summarized text is comprised of sentences expressed by the customer; and (iii) operating a semantic comparison unit, to compare each sentence in the yielded summarized text with a corresponding sentence in the agent-call-logging, to yield a Sentence Similarity Score (SSS) for each sentence of the agent-call-logging.

16 Claims, 5 Drawing Sheets

Figure 5

SYSTEM AND METHOD TO EVALUATE AGENT CALL LOGGING IN A CONTACT CENTER

TECHNICAL FIELD

The present disclosure relates to the field of computerized systems and methods for improving quality of service, in a contact center, by evaluating an agent call logging.

BACKGROUND

Call centers constantly strive to improve their efficiency, for example, by improving agent's interactions with customers, by increasing overall service levels, improving agent productivity, employing effective training assignments and elevating customer satisfaction.

Current contact center systems monitor all agents' interactions to evaluate agents' performance. Commonly, the monitoring of agent's performance is maintained by a platform having quality management plans, which automatically receive recorded interactions for agents' performance evaluation, randomly or based on business preferences. These systems of the contact center further maintain automate alerts and distribution of interactions for evaluations, disputes, calibrations and coaching.

The practice of logging an interaction between an agent and a customer by the agent is named, agent call logging. An agent call logging is considered to be effective when the agent call logging includes a valuable insight into the interaction, e.g., how pleased the customer is and/or whether an inquiry of the customer is resolved.

Ineffective agent call logging may have a detrimental impact on the overall business performance, because it may directly impact the contact center efficiency and may degrade overall customer experiences. For example, when the agent is logging in the call logging 'wrong bill' instead of 'bill payment is not reflected in the bill' it may impact future interactions with the customer, because in future interactions the agent will relate to the call logging which is stating 'wrong bill' while there was nothing wrong with the bill. The only thing was that the payment was not reflected in it.

Also, in case of ineffective agent call logging, for instance, when logging 80% of 80,000 calls, then 16,000 calls are left uncategorized and out of sight, and thus, there is a greater probability of significant data points, such as inefficient processes and ineffective knowledgebase, which are left unattended.

Accordingly, the operational efficiency of a call center may be improved by reducing the amount of ineffective agent call logging and ensuring effective call logging. Additionally, measuring the effectiveness of an agent call logging may assist an evaluator to better evaluate an agent's performance and may provide a way for the contact center to improve lack of refresher training and to reduce high attrition rate of agents.

Accordingly, there is a need for a technical solution that will provide an indication of agent call logging effectiveness and will also ensure that the call logging is effective and doesn't miss significant interaction information.

Moreover, there is a need for a technical solution to gauge completeness of call logging by an agent, to get insights into improvement areas for an agent for effective agent call logging and to ensure the contact center does not lose on key customer insights.

SUMMARY

There is thus provided, in accordance with some embodiments of the present disclosure, a computerized method for evaluating agent-call-logging, in a contact center.

Furthermore, in accordance with some embodiments of the present disclosure, in a computerized system comprising a processor, a database of recorded interactions; a database of call loggings, and a memory to store the plurality of databases, the processor may be configured to operate an evaluating agent-call-logging module.

Furthermore, in accordance with some embodiments of the present disclosure, the operating of the evaluating agent-call-logging module may comprise: (i) receiving a recorded interaction between an agent and a customer, stored in the database of recorded interactions and a corresponding agent-call-logging, having 'n' sentences, stored in the database of call loggings; (ii) operating speech-to-text algorithm on the received recorded interaction to yield a summarized text thereof. The yielded summarized text may be comprised of sentences expressed by the customer; and (iii) operating a semantic comparison unit, to compare each sentence in the yielded summarized text sentence with a corresponding sentence in the agent-call-logging, to yield a Sentence Similarity Score (SSS) for each sentence of the agent-call-logging. The operating of speech-to-text algorithm to yield summarized text, may use a text summary algorithm.

Furthermore, in accordance with some embodiments of the present disclosure, the processor may be further configured to compare the yielded SSS of each sentence, of the 'n' sentences, to a preconfigured match threshold, and to send a sentence mismatch-alert to a user, when the SSS is below the preconfigured match threshold.

Furthermore, in accordance with some embodiments of the present disclosure, the user may be any entity that is preconfigured to be associated with the recorded interaction. Optionally, the user may be the agent of the recorded interaction.

Furthermore, in accordance with some embodiments of the present disclosure, the evaluating agent-call-logging module may be further comprising calculating a Logging Effectiveness Score (LES) of the agent-call-logging.

Furthermore, in accordance with some embodiments of the present disclosure, the evaluating agent-call-logging module may be calculating the LES of the agent-call-logging by adding SSS of one or more of the sentences or each sentence of the 'n' sentences, to yield a total score and dividing the total score by 'n'.

Furthermore, in accordance with some embodiments of the present disclosure, the calculated LES of the agent-call-logging may be forwarded to associated systems. The associated systems may be selected from at least one of: Quality Management (QM) system, Workforce Management (WFM) system and supervisor dashboard system.

Furthermore, in accordance with some embodiments of the present disclosure, the operating of the semantic comparison unit may be performed based on an implementation of a word embedding method on each sentence in the yielded summarized text to generate a first feature vector and an implementation of a word embedding method on each sentence in the agent-call-logging to generate a second feature vector. The word embedding method may be selected from at least one of: Term Frequency-Inverse Document Frequency (TF-IDF), Word2Vec and Smooth Inverse Frequency (SIF) methods.

There is further provided, in accordance with some embodiments of the present invention, a computerized system for evaluating agent call logging in a contact center. The computerized system may be comprising: a database of recorded interactions; a database of call loggings; a memory to store the plurality of databases; and a processor. The processor may be configured to operate an evaluating agent-call-logging module.

Furthermore, in accordance with some embodiments of the present disclosure, the operating of evaluating agent-call-logging module may be comprising: (i) receiving a recorded interaction between an agent and a customer, stored in the database of recorded interactions and a corresponding agent-call-logging, having 'n' sentences, stored in the database of call loggings; (ii) operating speech-to-text algorithm on the received recorded interaction to yield a summarized text thereof. The yielded summarized text may be comprised of sentences expressed by the customer; and (iii) operating a semantic comparison unit, to compare each sentence in the yielded summarized text sentence with a corresponding sentence in the agent-call-logging, to yield a Sentence Similarity Score (SSS) for each sentence of the agent-call-logging. The operating of speech-to-text algorithm to yield summarized text, may use a text summary algorithm.

BRIEF DESCRIPTION OF THE DRAWINGS

FIG. 5 schematically illustrates an example of a computerized method for evaluating agent-call-logging, according to some embodiments of the present disclosure.

DETAILED DESCRIPTION

Figure 1:
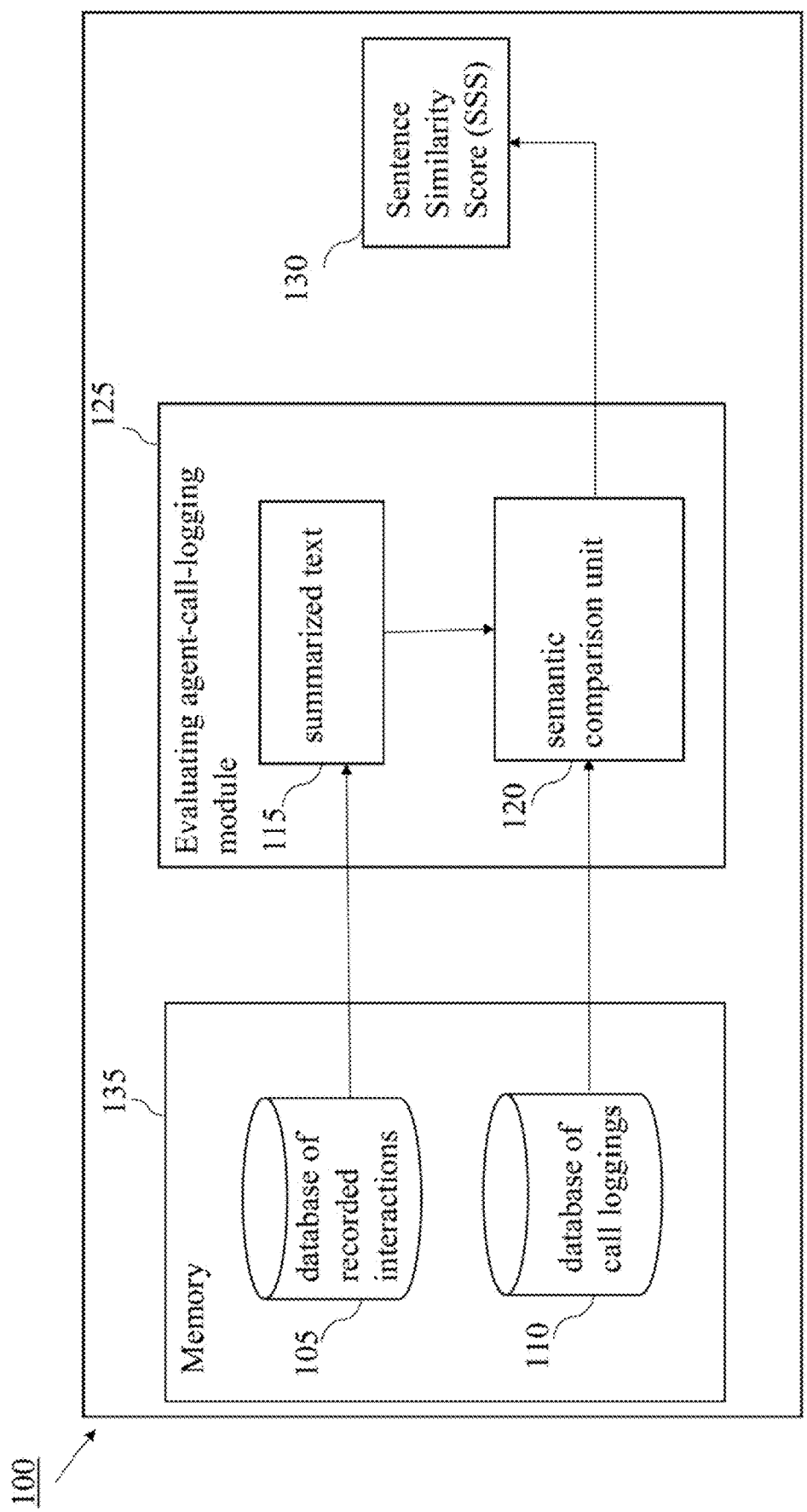
FIG. 1 schematically illustrates a high-level diagram of evaluating agent-call-logging module, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "Summarized Text (ST)" as used herein, refers to a text which is yielded by operating a speech-to-text algorithm on a recorded interaction. The speech-to-text algorithm may be using a text summary algorithm.

The term "Sentence Similarity Score (SSS)" as used herein, refers to a semantic comparison of each sentence in an agent call log against a call summary, i.e., text summary, which is quantified to a score.

The terms "call log", "Logged Text (LT)" and "call logging" are interchangeable.

The term "Logging Effectiveness Score (LES)" as used herein, refers to a mean value of SSS across one or more sentences in a call log.

The term "Net Promoter Score (NPS)" as used herein, refers to a measurement of customer experience and predicts business growth.

In a contact center, an effective agent call logging may be considered as important as the call itself, because a careful and methodical call logging leaves a lasting trace of the call and the customer's impression, which may improve the quality of service and customer satisfaction over time. Therefore, in the effort to improve quality of service and customer satisfaction in a call center, the level of effectiveness of agent-call-logging may be measured for further action.

Remote working conditions of agents in a call center, have further increased the probability of ineffective call logging and the probability that the corresponding agent-call-logging being prone to errors. Ineffective agent-call-logging may lead to less accurate data about call types and resolutions. Incomplete call logging by the agent, may degrade customer experience and may reduce quality management visibility. Incomplete call logging may also have a detrimental impact on the contact center performance. An incomplete or missed call logging, may jeopardize customer experience and may have the contact center lose on key customer insights. In lieu of insufficient data points, quality management also doesn't have enough visibility on the effectiveness of agent call logging.

Large call centers receive hundreds of thousands of calls, and therefore an effective agent-call-logging may be significant and may add up high savings per year. Effective agent evaluation may also lead to increased job satisfaction, resulting in reduced attrition cost. E.g., reducing attrition by only 5 percent as a result of effective agent evaluation may result in high savings to the call center.

Moreover, each new agent hire is estimated to cost the contact center $10,000 to $20,000 in training, direct recruiting costs, and productivity loss during ramp up. A Cornell study estimates that replacing one agent equals about 16 percent of the contact center gross annual earnings. A workforce 2020 survey revealed 65 percent of today's employees, identify effective training along with growth opportunities, as their top motivators. Effective and optimal training assignments will save cost and may enhance agent productivity. Therefore, a reduced attrition may lead to low turnover rates resulting in decreased new hire and onboarding cost. Satisfied employees, i.e., agents, may provide an improved customer experience, which may result in increased Net Promoter Score (NPS), which is a customer experience measurement and a prediction of business growth.

To improve the operational efficiency of a call center, an effective agent-call-logging should be ensured as well as assistance to an evaluator in effective evaluation of agent performance should be provided. Thus, the effective agent-call-logging may provide a way for the contact center to improve lack of refresher training and high attrition rate.

Customer satisfaction may be a key in creating a long-term relationship with customers and may be linked to higher revenue of the call center or the company that is operating the call center. A First Call Resolution (FCR) may be associated with high levels of customer satisfaction. FCR may be a measure of how effectively the contact center conducts its business and is a function of many factors, including the complexity and types of transactions handled, the experience of agents, the quality of agent training, and tools such as knowledge management and remote control. Therefore, the FCR rate may be improved by finding a way to maintain an effective agent-call-logging.

Accordingly, there is a need for a technical solution that may calculate a Sentence Similarity Score (SSS) for each sentence in an agent-call-logging, to alert an entity that is associated with the recorded call, such as an agent, against inefficient or ineffective call logging. Furthermore, the SSS may be used for coaching and performance evaluation purposes to calculate a Logging Effectiveness Score (LES) for the entire agent-call-logging.

Furthermore, there is a need that the technical solution will forward the LES to associated systems, such as Quality Management (QM) system, Workforce Management (WFM) system and supervisor dashboard system and may be utilized for workforce optimization and quality management. For example, by providing training related to agent call logging, to agents with a LES below a preconfigured threshold.

FIG. 1 schematically illustrates a high-level diagram of a computerized system 100 having an evaluating agent-call-logging module 125, in accordance with some embodiments of the present disclosure.

According to some embodiments of the present disclosure, the computerized system 100 may comprise a memory 135 to store a database of recorded interactions, such as database of recorded interactions 105 and a database of call loggings, such as database of call loggings 110.

According to some embodiments of the present disclosure, the computerized system 100 may further comprise a processor which may be configured to operate the evaluating agent-call-logging module 125. The operating of an evaluating agent-call-logging module 125, may comprise receiving a recorded interaction between an agent and a customer, which is stored in the database of recorded interactions 105 and receiving a corresponding agent-call-logging from the database of call loggings 110.

According to some embodiments of the present disclosure, the corresponding agent-call-logging is having 'n' sentences. The corresponding agent-call-logging may be generated during or after an interaction between an agent and a customer. An agent-call-logging may be considered effective or efficient when the agent-call-logging provides a valuable insight into the interaction, e.g., how pleased the customer is and/or whether an inquiry of the customer is resolved or any other significant data related to the query of the customer.

According to some embodiments of the present disclosure, the processor may be further configured to operate a speech-to-text algorithm on the received recorded interaction to yield a summarized text 115 thereof. The yielded summarized text 115 may be comprised of sentences which were expressed by the customer during the interaction and may exclude sentences expressed by the agent or any other entity.

According to some embodiments of the present disclosure, the processor may be further configured to operate a semantic comparison unit, such as semantic comparison unit 120, to compare one or more sentences or each sentence in the yielded summarized text 115 with a corresponding sentence in the agent-call-logging, to yield a Sentence Similarity Score (SSS) 130, for each sentence of the agent-call-logging.

According to some embodiments of the present disclosure, the processor may be further configured to compare the yielded SSS 130 of each sentence to a preconfigured match threshold, and to send a sentence mismatch-alert to a user, when the SSS 130 is below the preconfigured match threshold.

According to some embodiments of the present disclosure, the operating of the semantic comparison unit 120 may be performed based on an implementation of a word embedding method on each sentence in the yielded summarized text 115 to generate a first feature vector and based on an implementation of a word embedding method on each sentence, in the agent-call-logging, to generate a second feature vector.

According to some embodiments of the present disclosure, the word embedding method may be selected from at least one of: Term Frequency-inverse Document Frequency (TF-IDF), Word2Vec and Smooth Inverse Frequency (SF) methods.

Figure 2:
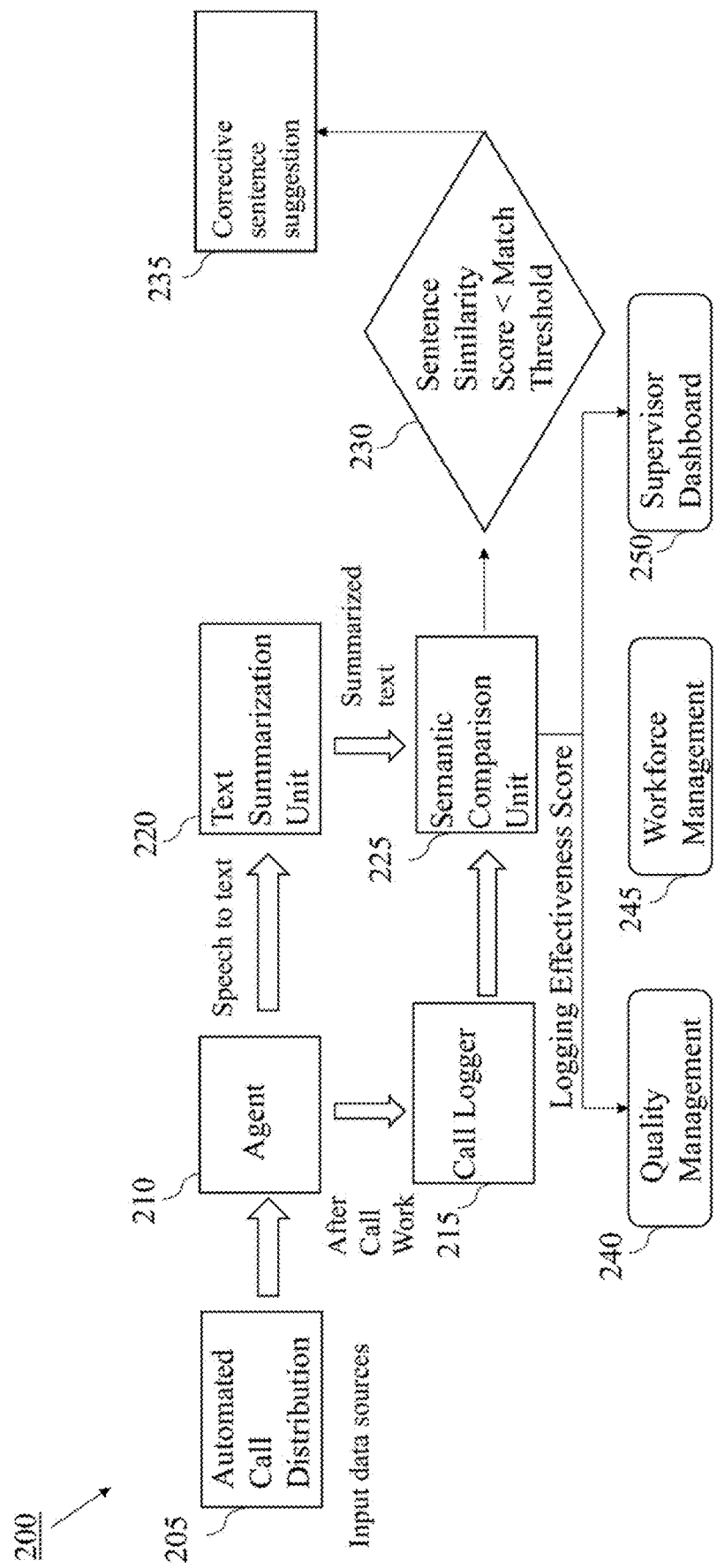
FIG. 2 schematically illustrates a high-level diagram for evaluating agent-call-logging module and alerting a user, in accordance with some embodiments of the present disclosure.

FIG. 2 schematically illustrates a high-level diagram for evaluating agent-call-logging module and alerting a user 200, in accordance with some embodiments of the present disclosure.

According to some embodiments of the present disclosure, an agent 210 may receive a customer's call routed through an Automated Call Distribution (ACD) such as ACD 205. The agent 210 may initiate an agent-call-logging of the interaction or an After Call Work (ACW), which may be stored in a call logger, such as Call Logger 215, which may be associated to a database, such as the database of call loggings 110, in FIG. 1.

According to some embodiments of the present disclosure, simultaneously a text conversion, such as speech-to-text and a text summarization of the recorded interaction between the agent and the customer, i.e., a summarized text, such as summarized text 115, in FIG. 1, may be operated by a text summarization unit, such as Text Summarization Unit 220.

According to some embodiments of the present disclosure, the text summarization, such as summarized text 115, in FIG. 1, may be forwarded to a semantic comparison unit, such as Semantic Comparison Unit 225. The Semantic Comparison Unit 225 may compare sentences from the agent-call-logging against sentences from the text summarization, such as summarized text 115, in FIG. 1 and may output a Sentence Similarity Score (SSS), such as SSS 130 in FIG. 1.

According to some embodiments of the present disclosure, a comparison to check if the SSS, such as SSS 130 in FIG. 1, is less than a preconfigured match threshold 230, may be operated, to send a corrective sentence alert, such as corrective sentence alert 235. The corrective sentence alert 235 may be provided to an entity that is associated with the recorded interaction, such as the agent 210.

According to some embodiments of the present disclosure, the SSS such as SSS 130 in FIG. 1, may be denoted as Si and may be calculated as follows:

$$S_i = \frac{s_{LT} \cdot s_{ST}}{\|s_{LT}\|\|s_{ST}\|},$$

whereby:
Si is Sentence Similarity Score,
SLT is Feature Vector from Logged Text, i.e., agent-call-logging, and
SST is Feature Vector from Summarized Text $$\|S\| = \sqrt{\sum_{i=1}^{i=n} x_i^2}$$

whereby xi is an element from feature vector.

According to some embodiments of the present disclosure, the match threshold may be preconfigured or may be calculated based on text summary of past calls and its corresponding agent-call-loggings. A user such as an expert evaluator, may decide if the logged text, i.e., agent-call-logging and the corresponding summarized text covers the same information. When the user decides that the logged text and the corresponding summarized text covers the same information it may attribute to it a positive feedback. Accordingly, each sentence in the logged text may be calculated an SSS, such as SSS 130, and the lowest SSS that is attributed a positive feedback may be the preconfigured match threshold. Alternatively, an LES may be calculated for each logged text and the lowest LES that is attributed a positive feedback may be the preconfigured match threshold.

According to some embodiments of the present disclosure, the Semantic Comparison Unit 225 may also calculate a Logging Effectiveness Score (LES). The LES may be a mean value of SSS across one or more sentences in the agent-call-logging. For example, the LES may be calculated by adding the SSS of each sentence of the 'n' sentences of the text summarization, such as summarized text 115, in FIG. 1, to yield a total score and dividing the total score by 'n'.

According to some embodiments of the present disclosure, the LES of the agent-call-logging may be forwarded to associated systems, such as Quality Management (QM) system 240, Workforce Management (WFM) system 245 and supervisor dashboard system 250.

According to some embodiments of the present disclosure, the LES may be calculated as follows:

$$LES = \frac{\sum_{i=1}^{n} S_i}{n},$$

whereby 'n' is the total number of sentences.

Figure 3:
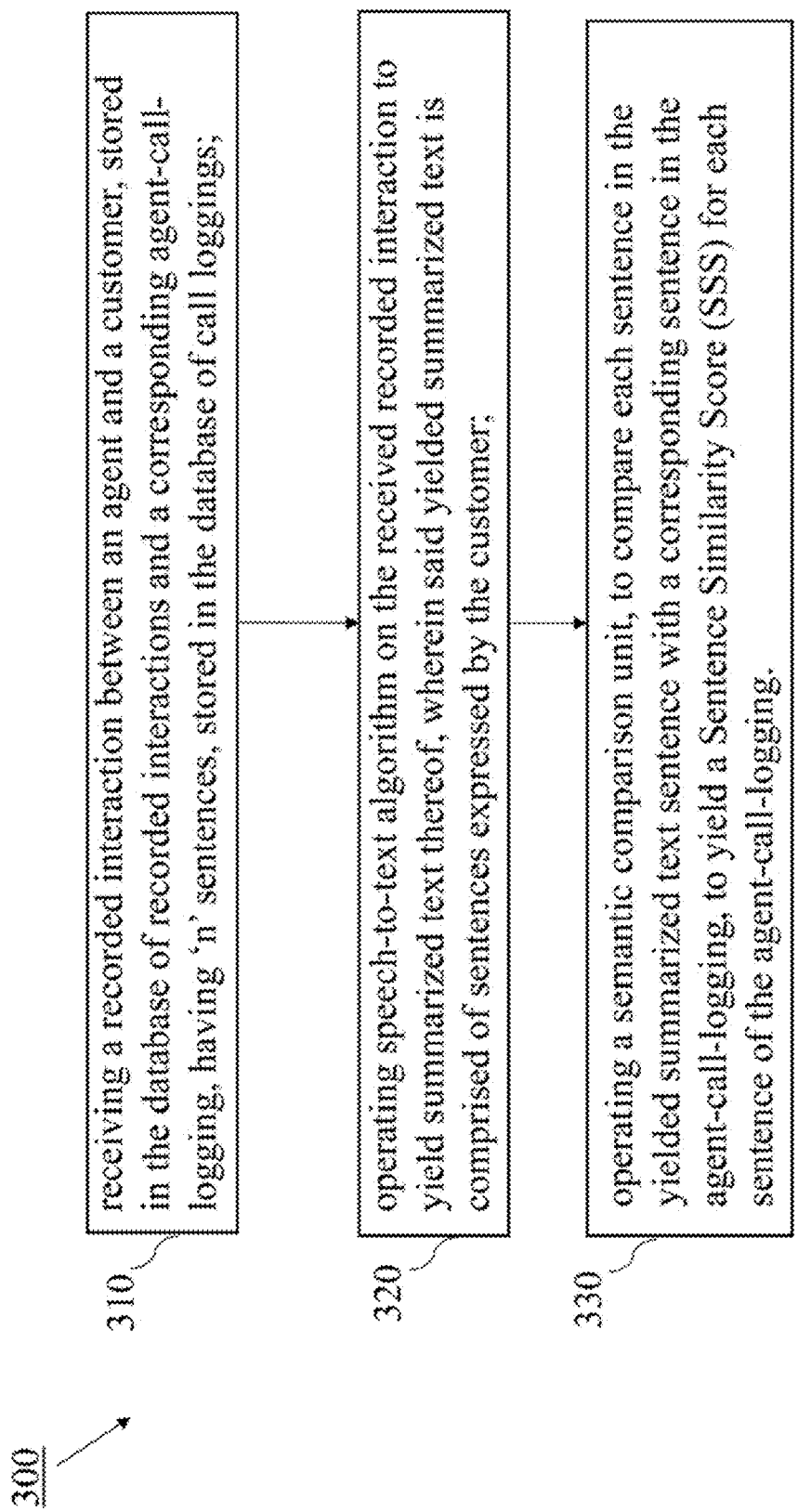
FIG. 3 schematically illustrates a high-level flow diagram depicting a computerized-method for evaluating agent-call-logging, according to some embodiments of the present disclosure.

FIG. 3 schematically illustrates a high-level flow diagram depicting a computerized-method for evaluating agent-call-logging 300, according to some embodiments of the present disclosure.

According to some embodiments of the present disclosure, a call from a customer may be routed to an agent. The interaction between the customer and the agent may be recorded and stored in a database of recorded interactions, such as the database of recorded interactions 105, in FIG. 1.

According to some embodiments of the present disclosure, operation 310 comprising receiving a recorded interaction between an agent and a customer, stored in the database of recorded interactions, such as database of recorded interactions 105 in FIG. 1, and a corresponding agent-call-logging, having 'n' sentences, stored in the database of call loggings, such as database of recorded interactions 110 in FIG. 1.

According to some embodiments of the present disclosure, operation 320 comprising operating speech-to-text algorithm on the received recorded interaction to yield a summarized text thereof, such as summarized text 115 in FIG. 1. The yielded summarized text, such as summarized text 115 in FIG. 1, may be comprised of sentences which were expressed by the customer during the interaction.

According to some embodiments of the present disclosure, operation 330 comprising operating a semantic comparison unit, such as semantic comparison unit 120 in FIG. 1 and semantic comparison unit 225 to compare each sentence in the yielded summarized text sentence with a corresponding sentence in the agent-call-logging, to yield a Sentence Similarity Score (SSS), such as SSS 130 in FIG. 1, for each sentence of the agent-call-logging.

Figure 4:
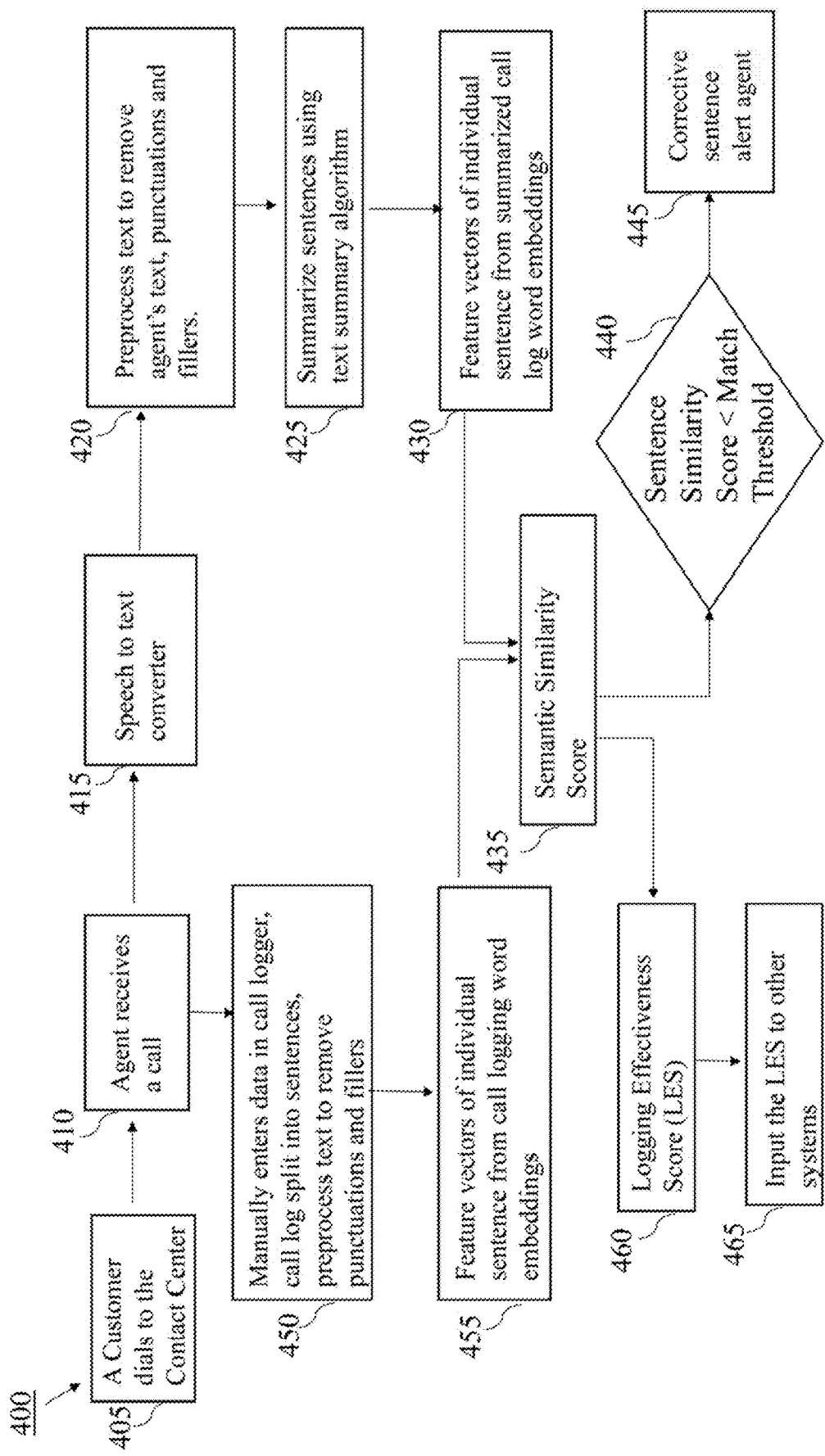
FIG. 4 schematically illustrates a detailed high-level diagram for evaluating agent-call-logging module and alerting a user, according to some embodiments of the present disclosure.

FIG. 4 schematically illustrates a detailed high-level diagram for evaluating agent-call-logging module and alerting a user 400, according to some embodiments of the present disclosure.

According to some embodiments of the present disclosure, feature vectors may be generated from received corresponding agent-call-logging, having 'n' sentences, which may be stored in a database of call loggings, such as database of call loggings 110, in FIG. 1.

According to some embodiments of the present disclosure, a customer may dial in the contact center 405 for a query or an issue to be resolved. An agent may receive the call 410 and during or after the interaction the agent may manually enter data in a call logger, such as call logger 215 in FIG. 2. The agent-call-logging may be split into sentences, and the text of the agent-call-logging may be further preprocess to remove punctuations and fillers 450.

According to some embodiments of the present disclosure, the received call may be recorded and stored in a database of recorded interactions, such as database of recorded interactions 105, in FIG. 1. Then, the computerized method for evaluating agent-call-logging, such as the computerized-method for evaluating agent-call-logging 300, in FIG. 3, may operate a speech-to-text convertor 415 on the received recorded interaction to yield summarized text thereof. The computerized-method for evaluating agent-call-logging 300, in FIG. 3, may summarize sentences using text summary algorithm 425.

According to some embodiments of the present disclosure, the summarized text may be generated using text summarizing algorithm by a text summarization unit, such as text summarization unit 220, in FIG. 2. The yielded summarized text may be comprised of sentences expressed by the customer, after preprocess of the text to tokenize, remove stop words and punctuation marks etc., and to remove agent's text, i.e. sentences that the agent said, punctuations and fillers 420. Feature vectors may be generated from the summarized text.

According to some embodiments of the present disclosure, the computerized method for evaluating agent-call-logging, such as the computerized-method for evaluating agent-call-logging 300, in FIG. 3, may operate a semantic comparison unit, such as semantic comparison unit 225 in FIG. 2 and semantic comparison unit 120 in FIG. 1, to compare each sentence in the yielded summarized text with a corresponding sentence in the agent-call-logging, to yield a Sentence Similarity Score (SSS), such as SSS 435 or SSS 130 in FIG. 1, for each sentence in the agent-call-logging.

According to some embodiments of the present disclosure, SSS 435 or SSS 130 in FIG. 1, may be yielded or generated by a semantic comparison of each sentence in agent-call-logging against the call summary, i.e. agent-call-logging against the summarized text, such as summarized text 115 in FIG. 1. The SSS 435 or SSS 130 in FIG. 1 is a quantified semantic similarity of two sentences, i.e., data entered by the agent manually in a call log and data from text summarization that may be automatically generated from the recorded interaction.

According to some embodiments of the present disclosure, sentences in the agent-call-logging may be for example: ["Customer called because of wrong bill."], ["Her name was Maegan Simpson and date of birth is Jul. 23, 1974."]. The corresponding summarized text which has been yielded from the recorded interaction may be ["I paid my phone bill two days ago and my payment is not reflected in the bill."], ["Maegan Simpson, Jul. 23, 1974 and the account is under my name."].

According to some embodiments of the present disclosure, the preprocess of the text of the agent-call-logging may be ["customer", "call", "wrong", "bill"] and ["name", "Maegan", "Simpson", "date", "birth", "July", "1974"].

According to some embodiments of the present disclosure, the preprocessing of the summarized text may be, for example, ["paid", "phone", "bill", "two", "day", "ago", "payment", "reflect"] and ["Maegan", "Simpson", "July", "23", "1974", "account", "name"].

According to some embodiments of the present disclosure, the generated feature vectors from the agent-call-logging may be [0.0, 0.579738671538, 0.0, 0.0, 0.0, 0.0, 0.0, 0.814802474667] and [0.334250730088, 0.334250730088, 0.0, 0.469777738499, 0.0, 0.469777738499, 0.334250730088, 0.334250730088, 0.334250730088] and the generated feature vectors from the summarized text may be [0.392044014622, 0.278942545326, 0.392044014622, 0.392044014622, 0.392044014622, 0.392044014622, 0.392044014622, 0.0] and [0.334250730088, 0.334250730088, 0.469777738499 0.0, 0.46977773849, 0.0, 0.334250730088, 0.334250730088, 0.334250730088].

According to some embodiments of the present disclosure, the calculated SSS, such as SSS 130, in FIG. 1, for the two sentences in the agent-call-logging may be 0.16171378, 0.55861775 and the LES may be 0.36016.

According to some embodiments of the present disclosure, the comparison may be operated based on an implementation of a word embedding method on each sentence in the yielded summarized text, such as summarized text 115, in FIG. 1, to generate a first feature vector and an implementation of a word embedding method on each sentence in the agent-call-logging to generate a second feature vector.

According to some embodiments of the present disclosure, the comparison may be further based on feature vectors of individual sentence from summarized call logging word embeddings 430 and feature vectors of individual sentence from call logging word embeddings 455.

According to some embodiments of the present disclosure, the computerized-method for evaluating agent-call-logging 300, in FIG. 3, may further compare the yielded SSS 435 of each sentence to a preconfigured match threshold 440, and may send a sentence mismatch-alert to a user, such as corrective sentence alert agent 235 in FIG. 2 or corrective sentence alert agent 445, i.e., inefficient call logging, when the SSS 435, is below the preconfigured match threshold.

According to some embodiments of the present disclosure, the computerized-method for evaluating agent-call-logging 300, in FIG. 3, may further calculate a Logging Effectiveness Score (LES) 460 of the agent-call-logging.

According to some embodiments of the present disclosure, the computerized-method for evaluating agent-call-logging 300, in FIG. 3, may calculate the LES 460 of the agent-call-logging, by adding SSS 435 of each sentence of the 'n' sentences, to yield a total score and may divide the total score by 'n'. The LES 460 for an agent may be taking into account cumulative SSS 435 for individual sentences in the call logging. The LES 460 may be a mean value of all SSSs across one or more sentences or all sentences, in the call logging.

According to some embodiments of the present disclosure, the computerized-method for evaluating agent-call-logging 300, in FIG. 3 may forward the LES 460 of the agent-call-logging to associated systems, i.e., input the LES 460 to other systems 465. The associated systems may be selected from at least one of: Quality Management (QM) system, such as QM system 240 in FIG. 2, Workforce Management (WFM) system, such as WFM system 245 and supervisor dashboard system, such as, supervisor dashboard system 250.

According to some embodiments of the present disclosure, the LES 460 may be utilized for various activities like effective coaching, agent performance evaluation, work force optimization and quality management. The LES 460 may be utilized for later on effective agent evaluation, because it may reflect the agent's ability to perform an effective call logging.

Figure 5:
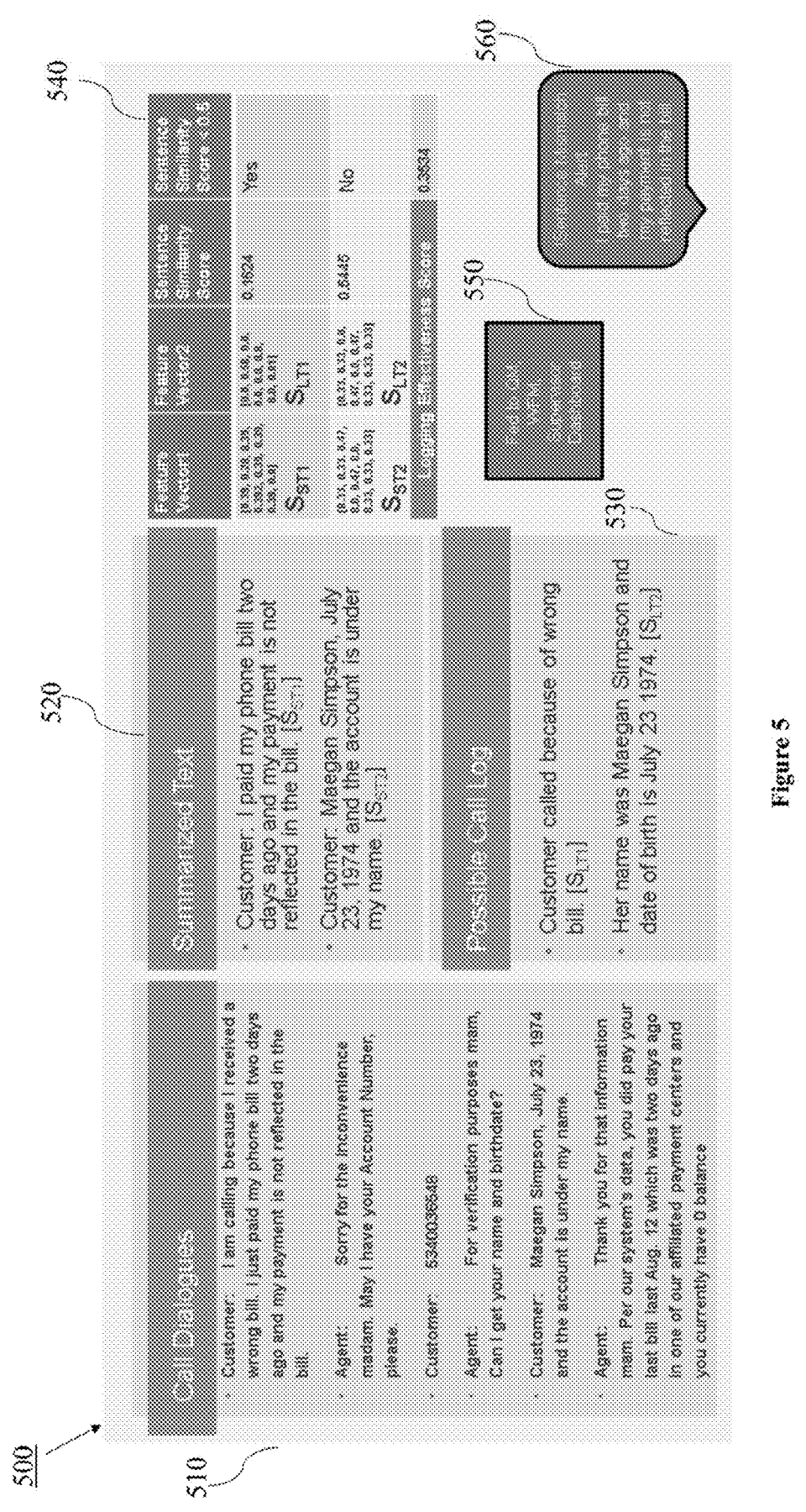

FIG. 5 schematically illustrates an example of a computerized method for evaluating agent-call-logging 500, according to some embodiments of the present disclosure.

According to some embodiments of the present disclosure, in a contact center a call from a customer may be routed to an agent. The dialog during the interaction between the customer and the agent may include a dialog, i.e., sentences expressed by the customer and sentences expressed by the agent. For example, a dialog such as the dialog in element 510. The interaction may be recorded and stored in the database of recorded interactions, such as database of recorded interactions 105 in FIG. 1. After the call ends the agent may initiate an after call work, i.e., agent-call-logging which is stored in a database of call loggings such as database of call loggings 110, in FIG. 1.

According to some embodiments of the present disclosure, an agent-call-logging for the interaction may be for example, possible call logging 530. The agent-call-logging, such as shown by element 530, may include the sentences: "customer called because of wrong bill." The sentence may be marked as '[$S_{LT1}$]' and "Her name was Maegan Simpson and date of birth Jul. 23, 1972." The sentence may be marked as '[$S_{LT2}$]'.

According to some embodiments of the present disclosure, a summarized text, which has been yielded from the recorded interaction, may be for example, summarized text 520, which includes the sentences: "Customer: I paid my phone bill two days age and my payment is not reflected in the bill." This sentence may be marked as '[$S_{ST1}$]' and "Customer: Meagan Simpson, Jul. 23, 1974 and the account is under my name." This sentence may be marked as '[$S_{ST2}$]'.

According to some embodiments of the present disclosure, the computerized method for evaluating agent-call-logging 500, may operate a semantic comparison unit, such as the semantic comparison unit 120, in FIG. 1, to compare each sentence in the yielded summarized text with a corresponding sentence in the agent-call-logging, to yield a Sentence Similarity Score (SSS) such as SSS 130 in FIG. 1, for each sentence of the agent-call-logging.

According to some embodiments of the present disclosure, the operating of the semantic comparison unit, such as the semantic comparison unit 120, in FIG. 1, may be performed based on an implementation of a word embedding method on each sentence in the yielded summarized text, such as element 520, and summarized text 115, in FIG. 1, to generate a first feature vector and an implementation of a word embedding method on each sentence in the agent-call-logging to generate a second feature vector.

According to some embodiments of the present disclosure, table 540 shows an example of the first feature vector which has been generated for the two sentences of the summarized text as shown in element 520 and the second feature vector which has been generated for the two sentences for the two sentences of the agent-call-logging as shown in element 530. The first feature vector for the sentence that was marked as '[$S_{ST1}$]' may be for example, [0.39, 0.28, 0.39, 0.392, 0.39, 0.39, 0.39, 0.0]. The first feature vector for the sentence that was marked as '[$S_{ST2}$]' may be for example, [0.33, 0.33, 0.47, 0.0, 0.47, 0.0, 0.33, 0.33, 0.33]. The second feature vector for the sentence that was marked as '[$S_{LT1}$]' may be, for example, [0.0, 0.58, 0.0, 0.0, 0.0, 0.0, 0.0, 0.81]. The second feature vector for the sentence that was marked as '[$S_{LT2}$]' may be for example, [0.33, 0.33, 0.0, 0.47, 0.0, 0.47, 0.33, 0.33, 0.33].

According to some embodiments of the present disclosure, the preconfigured match threshold may be 0.5. The SSS for the first sentence in the agent-call-logging, may be 0.1624, which is below the preconfigured match threshold. The SSS for the second sentence in the agent-call-logging may be 0.5445, which is above the preconfigured match threshold. Accordingly, the calculated LES for the agent-call-logging may be 0.3534.

According to some embodiments of the present disclosure, the computerized method for evaluating agent-call-logging 500 may send a sentence mismatch-alert to a user, when the SSS is below the preconfigured match threshold, such as sentence mismatch alert 560. The alert may include the wording taken from the summarized text. For example, "I paid my phone bill two days ago and my payment is not reflected in the bill.

According to some embodiments of the present disclosure, the LES of the agent-call-logging may be forwarded to associated systems. For example, the LES may be fed to QM, WFM and supervisor systems 550.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A computerized method for evaluating agent-call-logging, in a contact center, said computerized method comprising:
in a computerized system comprising a processor, a database of recorded interactions; and a database of call loggings, a memory to store the plurality of databases, said processor is configured to operate an evaluating agent-call-logging module, said operating of an evaluating agent-call-logging module comprising:
receiving a recorded interaction between an agent and a customer, stored in the database of recorded interactions and a corresponding agent-call-logging, having 'n' sentences, stored in the database of call loggings;
operating a speech-to-text algorithm on the received recorded interaction to yield a summarized text thereof, wherein said yielded summarized text is comprised of sentences expressed by the customer; and
operating a semantic comparison unit, to compare each sentence in the yielded summarized text with a corresponding sentence in the agent-call-logging, to yield a Sentence Similarity Score (SSS) for each sentence of the agent-call-logging,
wherein said processor is further configured to compare the yielded SSS of each sentence to a preconfigured match threshold, and to indicate an inefficient call logging to a user by sending a corrective sentence mismatch-alert thereto, when the SSS is below the preconfigured match threshold.

2. The computerized method according to claim 1, wherein the user is any entity that is preconfigured to be associated with the recorded interaction.

3. The computerized method according to claim 1, wherein the evaluating agent-call-logging module is further comprising calculating a Logging Effectiveness Score (LES) of the agent-call-logging.

4. The computerized method according to claim 3, wherein the evaluating agent-call-logging module is calculating the LES of the agent-call-logging by adding SSS of each sentence of the 'n' sentences to yield a total score and dividing the total score by 'n'.

5. The computerized method according to claim 3, wherein the LES of the agent-call-logging is forwarded to associated systems.

6. The computerized method according to claim 5, wherein the associated systems are selected from at least one of: Quality Management (QM) system, Workforce Management (WFM) system and supervisor dashboard system.

7. The computerized method according to claim 1, wherein the operating of the semantic comparison unit is performed based on an implementation of a word embedding method on each sentence in the yielded summarized text to generate a first feature vector and an implementation of a word embedding method on each sentence in the agent-call-logging to generate a second feature vector.

8. The computerized method according to claim 7, wherein the word embedding method is selected from at least one of: Term Frequency-Inverse Document Frequency (TF-IDF), Word2Vec and Smooth Inverse Frequency (SIF) methods.

9. A computerized system for evaluating agent call logging in a contact center, said computerized system comprising:
   a database of recorded interactions;
   a database of call loggings;
   a memory to store the plurality of databases; and
   a processor, said processor is configured to operate an evaluating agent-call-logging module, said operating of evaluating agent-call-logging module comprising:
   (i) receiving a recorded interaction between an agent and a customer, stored in the database of recorded interactions and a corresponding agent-call-logging, having 'n' sentences, stored in the database of call loggings;
   (ii) operating a speech-to-text algorithm on the received recorded interaction to yield a summarized text thereof, wherein said yielded summarized text is comprised of sentences expressed by the customer; and
   (iii) operating a semantic comparison unit, to compare each sentence in the yielded summarized text with a corresponding sentence in the agent-call-logging, to yield a Sentence Similarity Score (SSS) for each sentence of the agent-call-logging,
   wherein said processor is further configured to compare the yielded SSS of each sentence to a preconfigured match threshold, and to indicate an inefficient call logging to a user by sending a corrective sentence mismatch-alert thereto, when the SSS is below the preconfigured match threshold.

10. The computerized system according to claim 9, wherein the user is any entity that is preconfigured to be associated with the recorded interaction.

11. The computerized method according to claim 9, wherein the evaluating agent-call-logging module is further comprising calculating a Logging Effectiveness Score (LES) of the agent-call-logging.

12. The computerized system according to claim 11, wherein the evaluating agent-call-logging module is calculating the LES of the agent-call-logging by adding SSS of each sentence in the 'n' sentences to yield a total score and dividing the total score by 'n'.

13. The computerized method according to claim 11, wherein the LES of the agent-call-logging is forwarded to associated systems.

14. The computerized method according to claim 13, wherein the associated systems are selected from at least one of: Quality Management (QM) system, Workforce Management (WFM) system and supervisor dashboard system.

15. The computerized system according to claim 9, wherein the operating of the semantic comparison unit is performed based on an implementation of a word embedding method on each sentence in the yielded summarized text to generate a first feature vector and an implementation of a word embedding method on each sentence in the agent-call-logging to generate a second feature vector.

16. The computerized system according to claim 15, wherein the word embedding method is selected from at least one of: Term Frequency-Inverse Document Frequency (TF-IDF), Word2Vec and Smooth Inverse Frequency (SIF) methods.

* * * * *